United States Patent [19]
Cerniglia, Jr.

[11] 3,710,174
[45] Jan. 9, 1973

[54] INTENSITY MODULATED TEARDROP DISPLAY FOR A VECTORCARDIOGRAPH

[76] Inventor: Joseph Anthony Cerniglia, Jr., 5 Norris Rd., Lynnefield, Mass. 01940

[22] Filed: March 5, 1971

[21] Appl. No.: 121,468

[52] U.S. Cl..................315/22, 128/2.06 V, 315/30, 346/110
[51] Int. Cl. ..............................................A61b 5/04
[58] Field of Search..............128/2.06 V; 315/30, 22; 346/110

[56] References Cited

UNITED STATES PATENTS

| | | | |
|---|---|---|---|
| 3,333,580 | 8/1967 | Fawcett | 128/2.06 V |
| 3,186,403 | 6/1965 | Bassett | 315/22 X |
| 3,383,548 | 5/1968 | Goodale | 315/22 X |
| 3,509,878 | 5/1970 | Shaw | 128/2.06 V |
| 2,860,284 | 11/1958 | McKim | 315/22 |

*Primary Examiner*—Carl D. quarforth
*Assistant Examiner*—E. E. Lehmann
*Attorney*—Stephen P. Fox

[57] ABSTRACT

In a vectorcardiograph system, the vector loops are displayed as a plurality of teardrop-shaped dashes. The dashes are produced by modulating the beam of a cathode ray tube in response to the voltage developed across a charging capacitor. The charging rate of the capacitor is controlled by a current gate responsive to the velocity of the horizontal and vertical signals applied to the cathode ray tube. A pulse generator controls a gate to periodically discharge the capacitor, thereby to terminate one teardrop-shaped dash and begin another.

6 Claims, 8 Drawing Figures

INVENTOR
JOSEPH A. CERNIGLIA
BY Stephen P. Fox
ATTORNEY

INVENTOR
JOSEPH A. CERNIGLIA

INTENSITY MODULATED TEARDROP DISPLAY FOR A VECTORCARDIOGRAPH

BACKGROUND OF THE INVENTION

In conventional electrocardiography, the potential difference which appears between two points on the surface of the human body during the heart beat is recorded as a function of time. A number of electrocardiograms can be obtained from the heart by measuring the potential difference between various points on the body. There is a phase difference between the different electrocardiogram signals which can be measured by the technique of vectorcardiography. In this technique, the different signals obtained from the heart are plotted against one another in a rectangular coordinate system. Such a plot may be displayed on the screen of a cathode ray tube (CRT) by applying the different heart signals to the horizontal and vertical deflection circuits which control the position of the beam.

In vectorcardiography, one physiologically significant part of the curves displayed is the direction in which the heart vector curves are generated. When the curves are displayed by a cathode ray tube system, the heart vector directions are typically indicated by tracing the curve as a series of teardrop-shaped dashes on the CRT screen. A significant problem in such a display system is that the teardrop-shaped dashes are often not visually articulated on the CRT screen. If the CRT beam control circuitry is adjusted to produce a teardrop display for the high beam velocity portions of the heart signal, e.g. the QRS loop, then the teardrop display for the low beam velocity portions of the signal, e.g., the P and T waves, will have an undesirably large intensity on the screen and tend to "bloom." As a result, it is often difficult to determine the directions of the heart vectors which produce the display on the screen.

A conventional method of generating a teardrop display on the CRT screen is to modulate the beam with a saw-tooth signal and then either selectively clip this signal in response to the velocity at which the curve is traced in an attempt to provide a display having uniform intensity. However, this method produces degenerate forms of teardrop dashes. Consequently, there is still substantial difficulty in determining the direction of heart vectors.

Accordingly, it is an object of the present invention to provide a CRT beam modulating circuit which permits the display of a vectorcardiogram on the CRT screen in the form of a plurality of uniformly shaped, well defined, teardrop-shaped dashes so that the direction of the heart vector at all portions of the curve displayed can be easily read from the CRT screen.

SUMMARY OF THE INVENTION

In the present invention, as illustrated, horizontal and vertical beam deflection signals derived from the heart signals and applied to a cathode ray tube are differentiated and combined to provide a beam velocity signal output. This velocity signal drives a variably conducting current gate coupled between a current source and a chargeable capacitor. The charging rate of the capacitor is determined in response to the magnitude of the velocity signal. Thus, the voltage across the capacitor increases at a rate dependent upon the velocity signal. This increasing voltage signal is applied to the beam intensity control grid of the CRT, so as to produce a dash on the CRT screen which gradually increases in intensity. The visual appearance of the intensity modulated dash is that of a well defined teardrop. The chargeable capacitor is periodically rapidly discharged by a current gate which shunts the capacitor and which is rendered conductive in response to the periodically occurring pulses from a pulse generator. Each time the capacitor is discharged in synchronism with a pulse, a new charging cycle begins and a new teardrop-shaped dash is produced on the CRT screen. Since the intensity modulation of the beam is a direct function of the capacitor charging rate, which in turn is controlled by the velocity of the beam that traces the curve, the teardrops displayed are uniform in intensity and shape even though the beam velocity varies from one portion of the curve to another. The teardrop-shaped dashes clearly indicate the direction of the heart vectors represented by the CRT display. Means are provided for changing the repetition rate of the teardrop-shaped dashes to permit optimization of visual articulation in either the QRS portion or the P and T portion of the curves displayed.

DESCRIPTION OF THE PREFERRED EMBODIMENT

Figure 1:
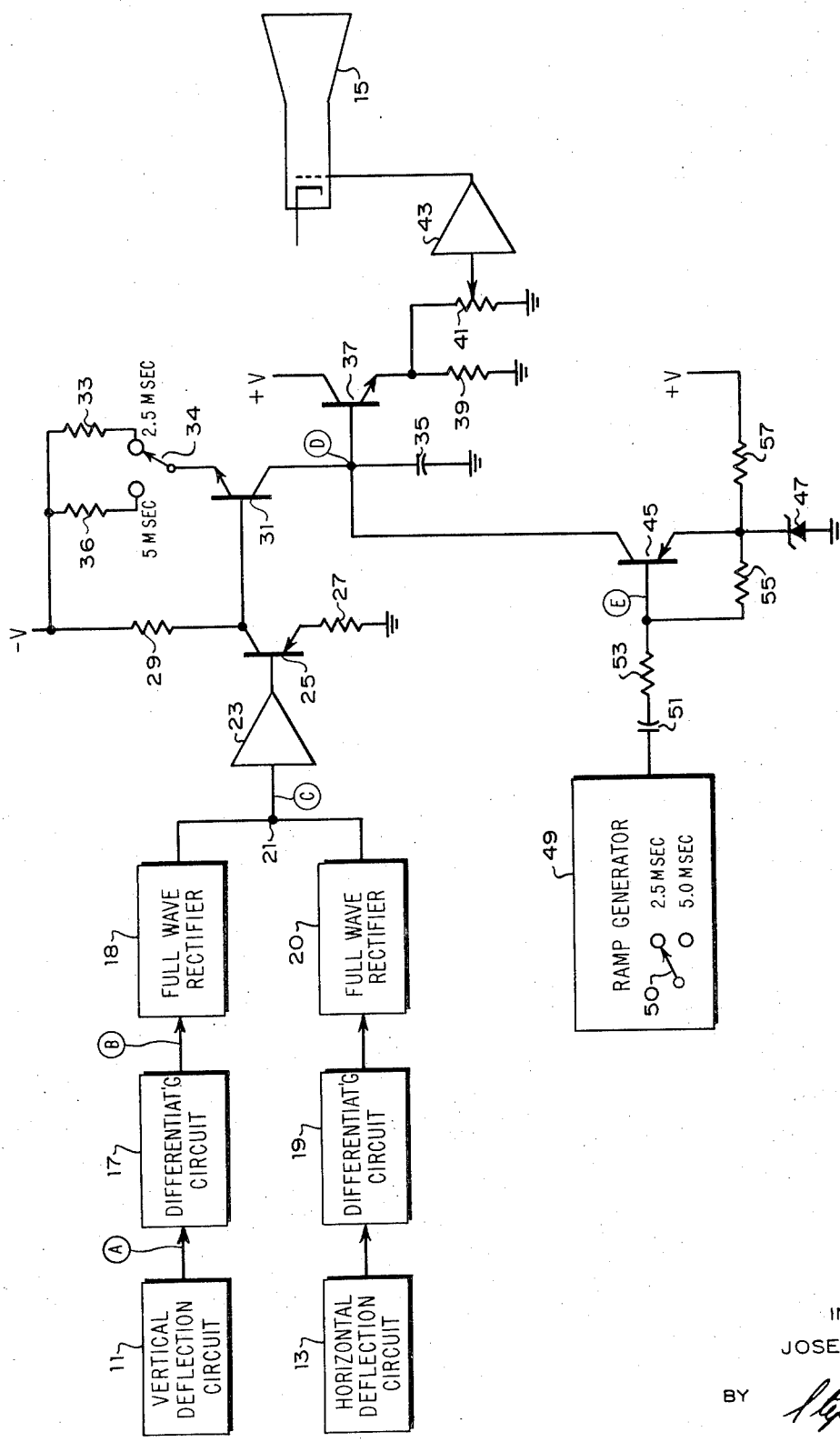
FIG. 1 is a combined schematic and block diagram illustrating the preferred embodiment of the CRT beam intensity modulating circuit of the present invention.

Referring now to FIG. 1, heart signals from a patient are applied to vertical and horizontal deflection amplifier circuits 11, 13 by suitable input circuitry, not shown. The outputs of these two deflection circuits provide positional information for deflecting the beam of a cathode ray tube 15. The circuitry for coupling of the deflection circuits 11, 13 to control the beam of the CRT 15 is conventional and is not shown.

The outputs of deflection circuits 11, 13 are coupled through differentiating circuits 17, 19, respectively. The differentiating circuits transform the positional information from the corresponding deflection circuit into a velocity signal representative of the rate of change of the beam deflection signals. The outputs of the differentiating circuits 17, 19 are rectified by full wave rectifiers 18 and 20 respectively, and then combined at a common terminal 21 and applied through a signal inverting buffer amplifier 23 to the control electrode of a PNP transistor 25. This transistor is operated in a class A amplification mode by suitable selection of the emitter resistor 27, collector resistor 29 and the supply voltage −V. Transistor 25 inverts the velocity signal and shifts the bias level of the signal for application to the control electrode of an NPN transistor 31.

Transistor 31 is a variable current gate which supplies current from the voltage source −V through an emitter resistor 33 and a switch 34 to a capacitor 35. This capacitor is charged at a rate which depends on the magnitude of the velocity signal applied to the base control electrode of transistor 31. As the capacitor 35 charges, the voltage across it increases negatively toward −V. This voltage signal is applied to the base control electrode of an NPN transistor 37 which is connected in an emitter-follower configuration. Transistor 37 serves as a high impedance load for the voltage signal developed across capacitor 35. The signal developed across emitter resistor 39 is applied through a variable voltage divider resistor 41 and thence through an inverting amplifier 43 to the beam intensity control grid of the CRT 15. The variable resistor 41 permits adjustment of the length of teardrops displayed on the CRT screen, but does not alter the timed intervals between the leading edges of the teardrops.

Capacitor 35 is periodically discharged through the series connection of a PNP transistor 45 and a Zener diode 47. Transistor 45 is operated as a current gate in a switching mode, and is rendered periodically briefly conductive in response to pulses applied to the base control input thereof. These input pulses are derived from a ramp generator 49 which produces a repetitive ramp signal output. Suitable means, represented by switch 50, are provided for setting the duration of the ramp waveform to a selected value, for example, 2.5 milliseconds, as shown. The ramp signal is differentiated by a capacitor 51 in combination with the load resistance provided by resistor 55 in parallel with the input impedance of transistor 45. The differentiated ramp signal at the base of transistor 45 is a periodically recurring voltage spike. Each voltage spike causes transistor 45 to conduct and discharge capacitor 35. The Zener diode 47, in conjunction with resistor 57, serves to apply a net positive voltage on capacitor 35 so that the ramp voltage generated by capacitor 35 is compatible with the proper input bias level of transistor 37.

Figure 2:
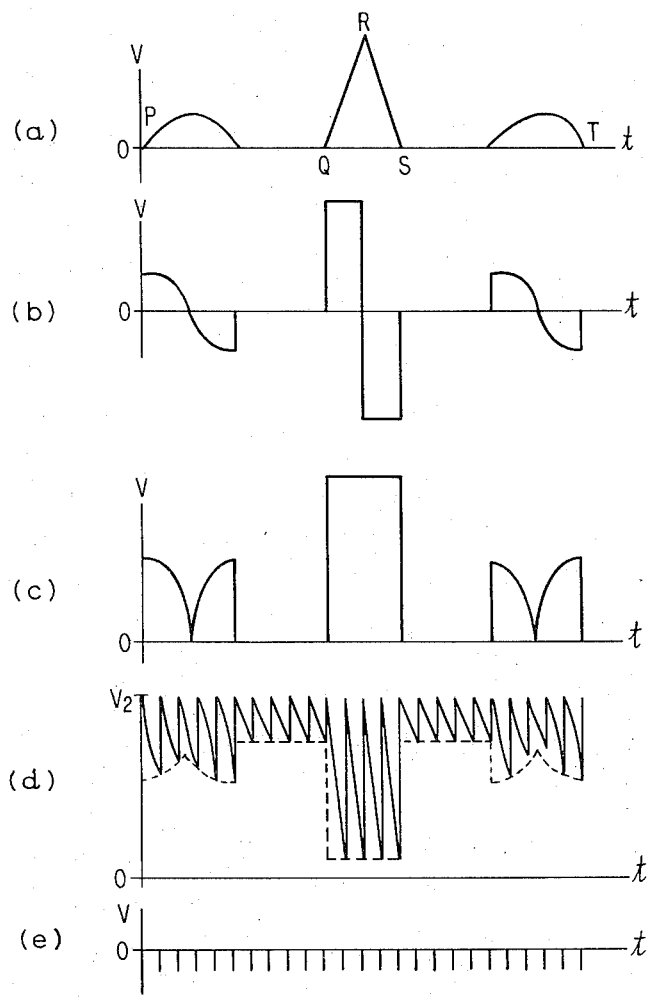
FIGS. 2a–e are a plurality of waveforms taken at different points in the circuit of FIG. 1.

The overall operation of the circuit of FIG. 1 may be understood with reference to the waveforms of FIGS. 2a–e. FIG. 2a illustrates an idealized form of the P-QRS-T portion of an electrocardiograph signal which appears at point A in FIG. 1, i.e., at the output of the vertical deflection circuit 11. A similar signal is obtained at the output of the horizontal deflection circuit 13; however, the signals from the two deflection circuits 11, 13 differ in phase. The differentiated form of the P-QRS-T complex appears at point B in FIG. 1 (the output of differentiating circuit 17) and is shown in FIG. 2b. The waveform of FIG. 2b represents the velocity of the electrocardiograph signal. The absolute value of this velocity signal is obtained at the output of full wave rectifier 18 and is combined with the absolute value of the velocity signal from the horizontal beam deflection circuit. The resulting velocity signal output at point C in FIG. 1 is illustrated in FIG. 2c. This velocity signal varies in response to the electrocardiograph signals and controls the degree of conductance of the variable current gate 31, thus controlling the charging rate of capacitor 35.

The voltage across capacitor 35, at point D in FIG. 1, is illustrated in FIG. 2d. As shown, the voltage across this capacitor is a plurality of ramp waveforms. Each time the capacitor is discharged through transistor 45, a new ramp waveform begins. The negative pulses which render transistor 45 briefly conductive to discharge capacitor 35 are shown in FIG. 2e and correspond to the pulse signal at point E in FIG. 1, i.e., at the base control electrode of transistor 45. As described above, the repetitive ramp waveforms which appear across capacitor 35 are applied to the grid of the CRT 15 to control the beam intensity. The beginning of each ramp signal is referenced to the Zener voltage $V_2$ of Zener diode 47, and the voltage polarity is such that a greater intensity beam is produced at the end of each ramp wave-form than at the beginning thereof. More specifically, the negatively going magnitude of the ramp waveform (FIG. 2d), when inverted by amplifier 43, causes the beam intensity to increase.

As shown in FIG. 2d, the repetitive ramp waveforms have an envelope corresponding to the waveform in FIG. 2c, which represents the absolute value of the velocity of the CRT beam as it traces the vectorcardiograph curve on the screen. It can be seen that the slope and magnitude of each ramp waveform depend on the beam velocity signal applied to the base control input of transistor 31, and that both the slope and the magnitude increase when the velocity of the CRT beam increases. Each ramp waveform, shown in FIG. 2d, produces a teardrop-shaped dash on the CRT screen, and the shape of the teardrop is determined by the slope of the ramp waveform. Ideally, each of the increasing ramp waveforms is a straight line; however in practice, the ramps produced during the P and T portions of the heart signal are slightly curved, due to the fact that the conductance of current gating transistor 31 changes in response to the CRT beam velocity while capacitor 35 is being charged. For purposes of illustration, the curved ramp waveforms are accentuated in FIG. 2d.

Figure 3A:
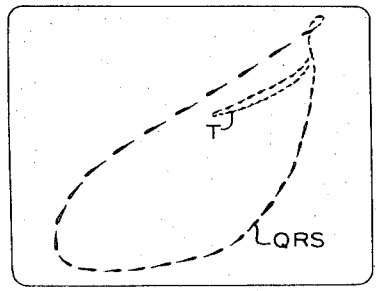
FIGS. 3a–b are views of a CRT screen illustrating vectorcardiograph curves displayed in the form of a plurality of teardrop-shaped dashes which are produced by the circuit of FIG. 1.
Figure 3B:
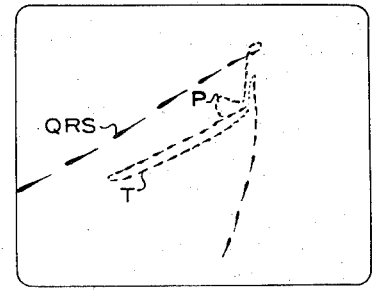

FIGS. 3a–b illustrate typical vectorcardiograph curves displayed on the CRT in the form of a plurality of teardrop-shaped dashes produced by the circuit of FIG. 1. For the low beam velocity signals in the P and T portions of the electrocardiograph signal, relatively short, closely spaced, teardrop-shaped dashes are produced; whereas for the higher beam velocity signals in the QRS portion of the electrocardiograph signal, longer and more widely spaced teardrop-shaped dashes are produced. For both high velocity and low velocity signals, the dashes displayed on the CRT screen have a well defined, clearly readable teardrop-shape, and they are of uniform intensity, thereby permitting easy recognition of the direction of travel of the heart vector which produces the curve traced on the screen.

The resolution of the teardrop display in selected portions of the curve may be increased by changing the time interval at which the dashes are generated. This is achieved by changing the repetition rate of the ramp waveforms from ramp generator 49 (FIG. 1) and by making a compensatory change in the value of the resistor in the emitter circuit of transistor 31. For example, in FIG. 3a, the teardrop dashes are produced at 2.5 millisecond intervals, due to the setting of ramp generator 49. As shown, the QRS portion of the curve is more defined than the lower velocity P and T portions. As shown in FIG. 3b, the P and T portions may be more clearly displayed by producing more widely spaced teardrop-shaped dashes. This is achieved by switching the output of ramp generator 49 so that each ramp waveform is 5 milliseconds in durations. Also, switch 34 is operated so that capacitor 35 charges more slowly through a resistor 36 which has a higher value than resistor 33.

I claim:

1. In a vectorcardiograph system, a circuit for controlling a cathode ray tube to indicate the directions of displayed vectorcardiograph signals by a plurality of teardrop-shaped dashes, the circuit comprising:

means for receiving and differentiating each of said horizontal and vertical beam deflection signals applied to said cathode ray tube to produce a velocity signal output;

a capacitor;

means for charging said capacitor at a rate determined in response to the magnitude of the velocity signal output from said receiving and differentiating means;

means coupled to said capacitor for periodically discharging said capacitor at a rate substantially greater than the charging rate of said capacitor; and means for amplifying the voltage developed across said capacitor, said amplifying means having an output coupled to the beam intensity control grid of said cathode ray tube.

2. The circuit of claim 1, wherein said capacitor charging means includes:

a source of current; and variable current gating means coupled between said current source and said capacitor, said gating means having a control electrode responsive to said velocity signal.

3. The circuit of claim 2, wherein said receiving and differentiating means includes:

means for full wave rectifying each of the differentiated horizontal and vertical deflection signals; and means for coupling the outputs of said full wave rectifying means in parallel to produce said velocity signal output.

4. The circuit of claim 3, further including amplifying means coupled between the velocity signal output of said receiving and differentiating means and the control electrode of said variable current gating means.

5. The circuit of claim 2, wherein said periodically discharging means includes:

pulse generator means for periodically producing pulses at selected time intervals; and gating means coupled across said capacitor for conducting current in response to the pulses from said pulse generator means.

6. The circuit of claim 5, wherein said pulse generator means includes a ramp generator and a network for differentiating the ramp signal from said ramp generator.

* * * * *